United States Patent Office 3,618,333
Patented Nov. 9, 1971

3,618,333
FLUIDIC CONTROLS FOR REFRIGERATION APPARATUS
Niels E. Pedersen, Milwaukee, and Otto R. Munch, West Allis, Wis., assignors to Johnson Service Company, Milwaukee, Wis.
Filed Apr. 2, 1970, Ser. No. 25,072
Int. Cl. F25b *41/04*
U.S. Cl. 62—217                                   9 Claims

ABSTRACT OF THE DISCLOSURE

A temperature responsive fluidic resistor monitors the temperature of chilled water flowing to a load from an evaporator of an electric motor driven refrigeration apparatus. The fluidic resistor in response to temperature change controls the output of a fluidic amplifier, which output is interconnected to a pneumatic relay. The relay controls a fluid motor which positions throttling mechanism to regulate the flow of refrigerant gas from the evaporator to the compressor to maintain a desired temperature of chilled water to the load.

---

The load on the compressor is limited by means of an electrical to fluidic transducer, comprising a fluidic amplifier having a diaphragm movable with respect to a control nozzle to control a fluidic output signal. The relative position of the diaphragm is set by the magnetic interaction of a magnetizable plate carried by the diaphragm with a permanent magnet and an electromagnet. The electromagnet generates flux in response to variations in the magnitude of the current flowing to the compressor motor, actuating the diaphragm to provide a fluidic output signal of the transducer corresponding to the motor current. The transducer fluidic output signal is superimposed onto the temperature indicating fluidic signal at the input to the pneumatic relay, causing actuation of the throttling mechanism to decrease refrigerant gas flow to the compressor, thereby limiting its load.

The invention relates to controls for electric motor driven refrigeration apparatus for operating the apparatus at a predetermined capacity corresponding to the refrigeration load and, in addition, to means limiting the capacity of the compressor to prevent exceeding a maximum safe current through its driving motor.

It is desirable to control refrigeration apparatus to maintain a desired temperature of refrigerant supplied to the load. In addition, it is desirable to prevent damage to the electric driving motor of the apparatus, by preventing the motor from drawing current of a magnitude which will damage it. Such a condition may arise, for example, when the refrigeration apparatus has been inoperative for a substantial time and is then started. Under such conditions, the suction pressure of the compressor is substantially equal to the saturation pressure of the refrigerant at ambient temperature. This pressure is higher than the normal suction pressure with the result that the flow rate of refrigerant gas through the compressor is increased considerably. Such a high flow rate undesirably puts a heavy load on the motor, causing the motor to draw current which will damage it.

Another instance when the motor will draw too much current is where the voltage applied to the motor is below the voltage rating of the motor, termed a "low voltage" condition.

The refrigerant apparatus comprises an electric motor driven compressor, a condenser and an evaporator interconnected to provide a refrigeration cycle. The compressor is connected through piping to the condenser where heat is removed from the refrigerant gas causing it to condense and flow to the evaporator. A secondary refrigerant liquid, such as chilled water, normally flows through piping in the evaporator from the load being refrigerated. Heat removal from the chilled water by the primary refrigerant causes the latter to boil into gas and flow to the compressor input, completing the cycle.

Prior art attempts to control refrigeration apparatus in response to the temperature of the secondary refrigerant supplied to the load and to limit excessive current drawn by the compressor motor have been made. Examples are the systems disclosed in U.S. Pats. 2,817,213, issued Dec. 24, 1957 and 3,380,262, issued Apr. 20, 1968, to Robert G. Miner. The first named Miner patent utilizes a pneumatic thermostat to monitor the temperature of the secondary refrigerant flowing to the load. The ouput of the pneumatic thermostat is connected to a pneumatic load limit relay which in response to the output of the thermostat controls a pneumatic motor. The motor positions throttling mechanism in the compressor suction pipe for controlling the flow of gas from the evaporator to the compressor to maintain a desired temperature of the secondary refrigerant. To limit overload current to the driving motor of the compressor, a current transformer monitors current flow to the compressor motor, its output actuating a solenoid to open and close a bleed port of the load limit relay, preventing the pneumatic thermostat from operating the compressor at a capacity which will damage the motor.

The second Miner Pat. 3,380,262, modified the arrangement by utilizing a thermistor sensor for monitoring the secondary refrigerant temperature; the thermistor being connected to an electric bridge circuit to provide a uni-directional pulsating electronic output signal but only in response to a decrease in the temperature monitored. The pulsating output signal is used to cause a diaphragm to vibrate to produce pressure pulsations which affect the air stream in a fluidic amplifier, reducing the pressure output to a pneumatic relay.

Additionally, by means of a current transformer, the current drawn by the electric motor of the compressor is monitored to control the output of a second fluidic amplifier interposed in series with the first fluidic amplifier at the input to the pneumatic relay which controls the throttling mechanism in the compressor suction line.

The current transformer controls the second fluidic amplifier through a bi-directional blocking diode electronic circuit which pulsates a diaphragm to affect the fluidic amplifier air stream, under conditions where the current monitored exceeds a predetermined limit, causing the diode to avalanche.

It is desirable to utilize modern fluidic control components and techniques, rather than bulky, costly pneumatic devices or electronic and fluidic hybrid arrangements. The latter undesirably requires a separate source of electrical power, are relatively expensive and require sophisticated skills and equipment in both fluidics and electronics, to make, install and maintain. Desirably, fluidic control systems are less bulky, less costly and relatively maintenance free with respect to comparable devices previously used, and do not require special equipment or personnel trained in electronics.

It is, therefore, an object of the invention to provide an improved control for electric motor driven refrigeration apparatus, including a load limiting control, which control is of relatively small size, is non-electronic and utilizes fluidic devices and techniques which are inexpensive to manufacture and maintain and are readily applied.

In carrying out the invention according to one preferred embodiment, a fluidic resistor which is temperature responsive is placed in position to monitor the temperature of the secondary refrigerant flowing to the load. The fluidic resistor in response to temperature varies the output of a summing impact modulator type fluidic amplifier, which output controls a pneumatic relay. The relay, in turn, controls a fluid motor which positions a damper at the intake to the compressor. When the fluidic resistor senses a temperature decrease in the secondary refrigerant flowing to the load, the rate of air flow through the resistor increases, causing an increase in pressure to a first jet of the summing impact modulator. This causes an increase in the output signal of the summing impact modulator, causing the pneumatic relay and the fluid motor to throttle the damper towards closed position to decrease the flow of refrigerant to the compressor, thereby maintaining the temperature of the secondary refrigerant at desired level.

The inverse is true, when the fluidic resistor senses a temperature increase. The arrangement, therefore, by fluidic means, monitors the temperature of the secondary refrigerant flowing to the load being refrigerated and maintains such temperature within predetermined limits in response to temperature increases and decreases of such refrigerant.

The load limit mechanism includes an electric to fluidic transducer which comprises a fluidic amplifier, the output of which is controlled by means of a diaphragm moved in and out of position with relation to its control nozzle. The diaphragm has a portion of magnetizable material which is in magnetic relationship with a permanent magnet and an electromagnetic coil; the current through the coil being related to the current to the compressor motor. An increase in current to the motor results in increasing the coil flux, causing the diaphragm to move towards the control port of the fluidic amplifier. This increases the output of the transducer, which output is superimposed on the input to the pneumatic relay to throttle the damper towards closed position, reducing the flow of gas from the evaporator to the compressor, thereby limiting the load on the compressor to prevent it drawing excessive current.

Features and advantages of the invention will be seen from the above and from the following description of the preferred embodiment, when considered in conjunction with the drawing, and from the appended claims.

Figure 1:
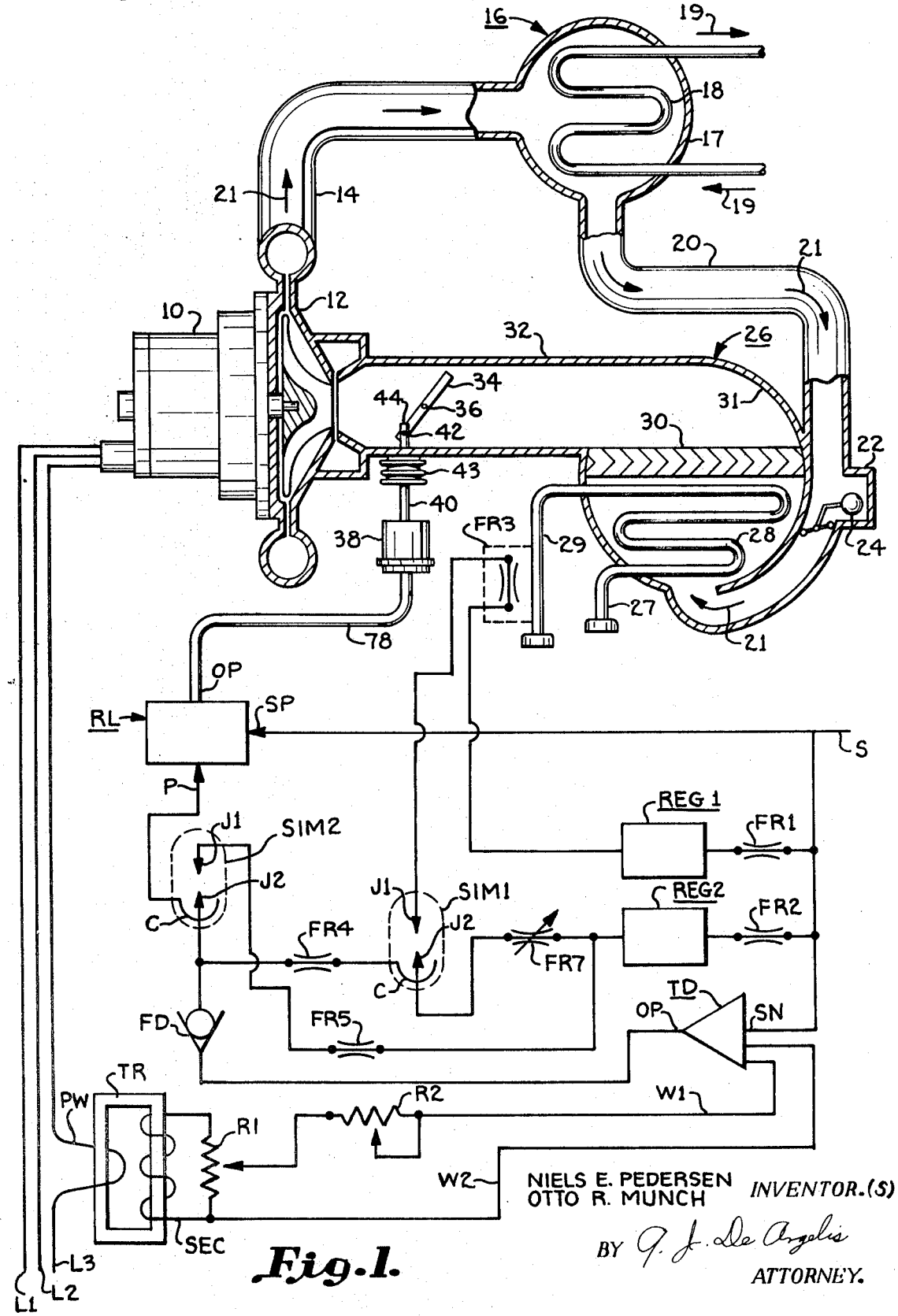
FIG. 1 is a simplified, diagrammatic representation of a refrigeration system of the electric motor driven compressor type, embodying the control system of this invention.

With reference to FIG. 1, an electric motor 10 is connected to and drives a compressor 12. Compressor 12 discharges refrigerant gas into a pipe 14 which conducts the gas to a condenser 16. The condenser is preferably of the shell and tube type in which water for cooling the refrigerant in shell 17 flows through tubes 18, as is indicated by directional arrows 19. Refrigerant liquid condensed in condenser 16 flows by gravity through pipe 20, to a float chamber 22. A float 24 in float chamber 22 opens and closes to control the flow of refrigerant liquid into an evaporator 26 which preferably is also of the shell and tube type. A secondary refrigerant liquid, such as chilled water, flows from the load (not shown) being refrigerated through conduit 27 into the tubes 28 in shell 31 of the evaporator and from tubes 28 through conduit 29 back to the load (not shown). In removing heat from the chilled water returning from the load in tubes 28 the refrigerant in the evaporator 26 boils, forming gas which passes through the liquid eliminator 30 and thence into a suction pipe 32 to the intake of compressor 12.

The direction of flow of the primary refrigerant is indicated by directional arrows 21.

Mechanism for throttling the flow of refrigerant gas from evaporator 26 to compressor 12 is provided in suction pipe 32 and, for convenience, is shown as a damper 34 pivotably mounted at 36 for pivotal movement into various angular positions to control the flow of gas to compressor 12. As is well known in such refrigeration apparatus, the rate of flow of gas through the compressor determines the power required by the motor and, thus, the current drawn by motor 10. By controlling the amount of refrigerant flowing to the compressor, damper 34 determines the current drawn by the motor 10.

Throttling means or damper 34 is actuated by a fluid motor 38, which for convenience, is shown as being of the pneumatic type having a rod 40 pivotably connected at 42 to the damper 34 through a bellows mechanism 43. Bellows 43 provides a fluid seal where the bellows actuator 44 protrudes into pipe 32. The bellows is flexed in response to upward movement of rod 40 to actuate by means of its actuator 44 damper 34. Fluid motor 38 may be of any known construction in which a piston or diaphragm translates pressure input into rod positions.

The position of damper 36 is controlled in response to the monitored temperature of the chilled water flowing from evaporator 26 through tube 29 to the load (not shown). Such control is effected by means of a fluidic control, comprising a fluidic thermostat controlling a pneumatic relay RL, the output of which is fed to fluid motor 38 by pipe 78 to control the position of damper 34. The fluidic thermostat comprises a temperature responsive, fluidic resistor FR3, placed on the chilled water conduit 29 at the output of evaporator 26 for sensing the temperature of the chilled water flowing to the load (not shown). It should be understood that fluidic resistor FR3 may be placed on evaporator 26, or placed in tube 29 by means of a well in any convenient manner, so long as it monitors the temperature of the chilled water flowing to the load. Fluidic resistor FR3 is interconnected at its output to one power jet J1 of a fluidic amplifier SIM1 and at its input to the output of a first pressure regulator REG1. The input of regulator REG1 is connected through a flow limiting fluidic resistor FR1 to a source of air under pressure over supply conduit S. The other power jet J2 of fluidic amplifier SIM1 also receives a supply of air under pressure from supply line S through a flow limiting fluidic resistor FR2, feeding into a second pressure regulator REG2 and, thence, through an adjustable fluidic resistor FR7. The fluidic amplifier SIM1 is preferably shown as being of the summing impact modulator type in which two opposing air jets interact to provide an output fluidic signal at a collector C in accordance with the relative strength of their respective jets determining a point of impact with respect to collector C. The output of collector C is fed through an isolating fluidic resistor FR4 to the dependent jet J2 of a second fluidic amplifier SIM2 also of the summing impact modulator type. A stream of air under pressure is supplied to the independent jet J1 of amplifier SIM2 from pressure regulator REG2 through a flow limiting fluidic resistor FR5. The output signal of amplifier SIM2 flows from its collector C to the input P of pneumatic relay RL. Relay RL also receives a flow of air from supply line S at SP as is indicated and provides an output pneumatic signal at its output OP feeding into conduit 78 in accordance with the magnitude of the signal applied to its input P from amplifier SIM2 to control fluid motor 38.

The load limiting control for motor 10 comprises a current transformer, generally designated TR, having a primary winding PW formed by one of the leads L3 of the three leads L1, L2, L3 supplying electrical alternating current power to motor 10 from any convenient source (not shown). Transformer TR has a secondary winding SEC across which an adjustable rheostat R1 is interconnected. The current flowing across resistor R1 is, thus, proportional to the current flowing to the motor 10 over line L3.

Rheostat R1 interconnects through adjustable resistor R2 to limit the current applied to an electric-fluidic transducer, generally designated TD over wires W1, W2.

The electric-fluidic transducer TD receives a supply of air under pressure from supply line S at its input SN and provides air under pressure at its output OP at a magnitude responsive to the electrical energy supplied to transducer TD over wires W1, W2 from transformer TR. The fluidic output signal of transducer TD is applied through a fluidic diode FD to—the dependent jet J2 amplifier SIM2—being superimposed on the signal from the thermostate to control relay RL and, in turn, fluid motor 38 to position damper 34, in response to the magnitude of the current drawn by motor 10, as will be explained hereinafter.

Figure 2:
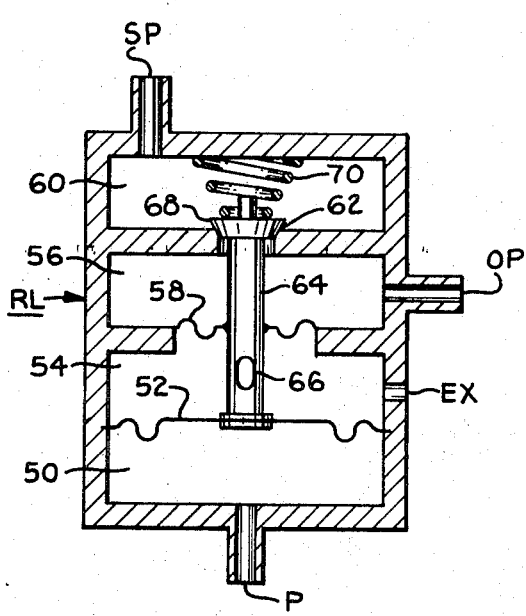
FIG. 2 is a simplified, diagrammatic, cross-sectional view, in front elevation, of a pneumatic realy RL used in the control system of FIG. 1.
Figure 3:
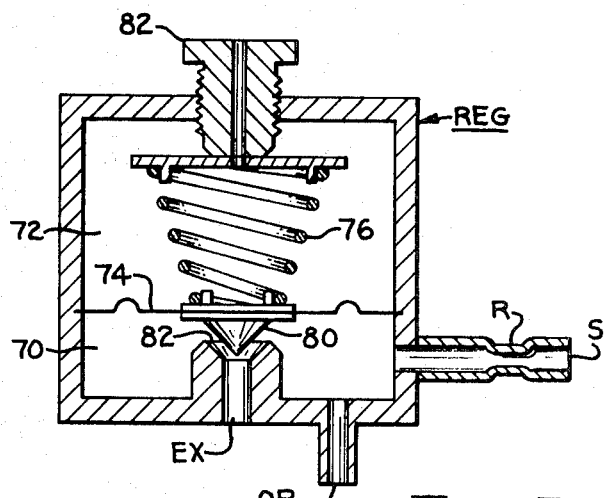
FIG. 3 is a simplified, diagrammatic, cross-sectional view, in front elevation, of a pressure regulator used in the control system of FIG. 1.

In one tested embodiment of the subject control, the fluidic amplifiers SIM1 and SIM2 were selected of the impact modulator type disclosed in the U.S. Pat. 3,272,215 to B. G. Bjornsen et al. issued Sept. 13, 1966. The amplifiers used were Johnson Service Company type number 25–3–0. The regulators RG1 and RG2 selected were Johnson Service Company type number 25–21–9. These will be described with reference to their diagrammatic representations in FIG. 3 hereinafter. Pneumatic relay R1 may be of any convenient type and is diagrammatically represented in FIG. 2, which will be described in detail hereinafter.

Fluidic diode FD was selected of Johnson Service Company type number F–2804–403, while fluidic resistors FR1, FR2, FR4 and FR5 were selected of Johnson Service Company type number 24–252–5. Variable fluidic resistor FR7 was selected of the Johnson Service Company type number F–2822–20. Temperature responsive fluidic resistor FR3, monitoring the chilled water in conduit 29 may be of any desired construction. For example, the resistor may be a linear capillary tube device, such as is more fully disclosed in the article entitled "Fluidic Resistors," published in Fluidic Quarterly, volume 1, Number 3, April 1968 by Paul H. Sorenson and Norbert T. Schmitz.

For a 5 ampere load from current transformer TR, rheostat R1 was selected of 120 ohms, while resistor R2 was selected of approximately 500 ohms.

Pneumatic relay RL (FIG. 2) includes a first lower chamber 50 for receiving a fluidic signal input through a conduit P. Chamber 50 is separated by a diaphragm 52 from an intermediate second chamber 54 which is vented to atmospheric pressure through an exhaust opening EX. An intermediate third chamber 56 is separated from chamber 54 by means of a second diaphragm 58. Air under pressure is supplied through a supply conduit S into an upper fourth chamber 60, interconnected to chamber 56 through a valve seat 62.

Chamber 56 is connected to an output conduit OP for supplying air under pressure thereto in response to the signal input at P. Diaphragms 58 and 52 are interconnected by a hollow tube 64. Tube 64 has an opening 66 for conveying air through the tube between chambers 54 and 56. This occurs, as will be explained, when the upper open end of the tube is moved away from a valve 68 which is spring biased by a spring 70 onto valve seat 62 and the open upper end of tube 64, as shown.

In operation, in the position shown, air under pressure from supply S is supplied to chamber 60 and remains therein, valve 68, 62 being closed. Assuming a supply of air through input P into lower chamber 50 of sufficient pressure, diaphragm 52 is moved upward, lifting through hollow tube 64 valve 68 off of valve seat 62. This permits air under pressure to flow from upper chamber 60 to chamber 56 and out conduit OP, supplying a pneumatic isgnal output from relay RL.

The increasing output pressure exerts a downward force on tube 64 through diaphragm 58. This force moves valve 68 towards closed position until the forces on diaphragm 52, the force of spring 70 and those on input diaphragm 52 balance each other. The output pressure of the relay at OP is, therefore, proportional to the input pressure at P, the gain being determined by the ratio of the effective areas of diaphragms 52 and 58.

When the input signal at P decreases, the force of diaphragm 58 exceeds that of diaphragm 52 acting on tube 64. Tube 64 moves downward out of engagement with the bottom of valve 68, thereby allowing air to exhaust into the top of the hollow tube 64 and out its opening 66 into chamber 54 and out exhaust EX. When sufficient pressure has been exhausted from chamber 56 to equalize the force of diaphragms 58 and 52 on tube 64, diaphragm 58 returns to its initial position, again seating the top of tube 64 against valve 68, closing the interconnecnection between chamber 56 and chamber 54.

Regulator REG (FIG. 3) receives air under pressure from the supply S through a fixed fluidic resistor R, the air flowing into a bottom chamber 70. Bottom chamber 70 is separated from an upper chamber 72 by a diaphragm 74 of any convenient type. Chamber 72 is vented to atmosphere. A spring 76 biases diaphragm 74 downward in position to seat valve 80 onto valve seat 82 for closing an interconnection between chamber 70 and exhaust opening EX. Chamber 70 is connected through conduit OP to supply air under pressure to a load. The force exercised by an adjusting spring 76 onto diaphragm 74 in opposition to the pressure in chamber 70 is adjusted by means of an adjusting screw 82 threaded into the upper portion of the regulator frame to select the pressure desired, as is well known.

In operation, fluctuations in the supply pressure and in air supplied to the load at output conduit OP are sensed by the differential pressure exercised on diaphragm 74 between chamber 72 and chamber 70, causing the diaphragm to move valve 80 relative to seat 82, regulating the flow of air through opening EX, thereby maintaining the pressure of air supplied over conduit OP from regulator REG within certain predetermined limits.

Figure 4:
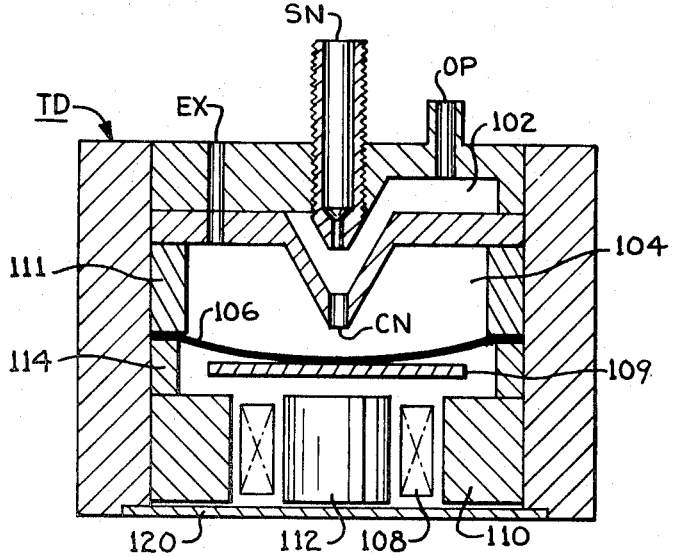
FIG. 4 is a simplified, diagrammatic, cross-sectional view, in front elevation, of an electric to fluidic transducer used in the control system of FIG. 1.

The electric-fluidic transducer TD (FIG. 4) includes a first input chamber 102 arranged for receiving air under pressure from a supply nozzle SN. Chamber 102 is connected to supply a fluidic output signal through a conduit OP. Aligned with supply nozzle SN is a control nozzle CN, opening into a second chamber 104, which is open to atmosphere through an exhaust opening EX. A diaphragm 106 having spring like characteristics is positioned across chamber 104 in position for movement relative to control nozzle CN. A magnetizable metal plate 109 is attached to diaphragm 106 for magnetic co-action with an electromagnet in the form of a coil 108 and a ring type permanent magnet 110. Electromagnetic coil 108 encircles a magnet core 112 and, in turn, the permanent magnet 110. Core 112 and magnets 108 and 110 are coaxially aligned with control nozzle CN for magnetic co-action with diaphragm plate 108. Spacers 111 and 114 are provided for placing diaphragm 106 and the magnets in proper position relative to control nozzle CN and the pole face of magnet core 112. A plate 120 of magnetic material closes the bottom of the transducer, while completing a path for the flux.

The transducer, thus, comprises a fluidic amplifier the output of which is controlled by the position of diaphragm 106 with respect to control nozzle CN, since such relative position controls the flow of air from chamber 102 to exhaust opening EX. As diaphragm 106 moves away from control nozzle CN, more air is exhausted through chamber 104, dropping the pressure in output chamber 102. This decreases the signal from the amplifier at OP.

The inverse is true, when diaphragm 106 moves towards control nozzle CN, decreasing the amount of air exhausting to atmosphere through chamber 104.

This electromagnetic transducer is the subject of and is disclosed in greater detail in a co-pending application of the inventor Niels E. Pedersen filed concurrently herewith and also assigned to the assignee of the subject application.

In operation, with air supplied to conduit SN an output signal of a certain level is emitted from output conduit OP with the diaphragm 106 in a predetermined position with respect to control nozzle CN. Permanent magnet 110 is selected of a force to magnetically co-act with metal plate 109 carried by the diaphragm 106 such that, when the electromagnetic coil 108 is energized with a certain amount of current, diaphragm 106 assumes a predetermined position with respect to control nozzle CN. The position of diaphragm 106 is, thus, determined by the selecion of the spring force exerted by diaphragm 106, the strength of permanent magnet 110 and the energization of coil 108. In the selected configuration plate 109 is saturated by the permanent magnet flux. During a given half cycle of the applied current, the flux generated by coil 108 is additive to the flux of permanent magnet 110. This additional flux is, thus, without effect on the already fully saturated plate 109. On alternate half cycles the coil flux is substructive with respect to the permanent magnet flux, thereby reducing the permanent magnet force tending to draw diaphragm 106 away from the control nozzle CN. The spring force of the diaphragm, thus, moves the diaphragm closer to control nozzle CN.

This transducer configuration is such that increasing current applied to electromagnetic coil 108 causes diaphragm 106 to assume a position closer to control nozzle CN, increasing the interference between the diaphragm and the air flowing out of the control nozzle. This allows less air to exhaust through opening EX, increasing the pressure in output chamber 102 and, therefore, the signal level flowing out of output conduit OP.

Referring to FIG. 1, in operation, to modulate the flow of gas from evaporator 26 to compressor 12 in response to the temperature of the secondary refrigerant flowing to the load, assume that air under presure is supplied to fluidic control circuit of FIG. 1. Regulators REG1 and REG2 with their respective flow restrictive fluidic resistors FR1, FR2 are selected and adjusted to provide predetermined output pressures. These pressures for a certain desired temperature sensed by temperature responsive fluidic resistor FR3 establish the operating set point of the summing impact modulator type fluidic amplifier SIM1. The setting of the adjustable orifice (adjustable fluidic resistor FR7) in series with the dependent jet J2 of amplifier SIM1 controls its sensitivity. With the set point established the streams flowing from independent jet J1 and the opposite dependent jet J2 impact to provide at collector C an output related to the position of the point of impact of the streams relative to the collector C. The output signal is fed to dependent jet J2 of the second fluidic amplifier SIM2 through isolating fluidic resistor FR4. The stream from jet J2 impacts with the stream from opposing independent jet J1 to provide a certain output signal at collector C, the pressure at jet J2 being established by the flow from regulator REG2 through fluidic resistor FR5. The output of amplifier SIM2 is applied to the input P of pneumatic relay RL predetermined position, allowing a certain rate of primary gas refrigerant flow to compressor 12 to maintain a certain temperature of the secondary refrigerant flowing to the load through conduit 29.

The flow through the fluidic temperature sensor, resistor FR3, varies in response to variations of the temperature being monitored to maintain the temperature of the secondary refrigerant flowing to the load at this preset condition as follows: Assume that fluidic resistor FR3 senses a temperature increase in the secondary refrigerant flow through conduit 29 to the load (not shown). Under such conditions, the flow through fluidic resistor FR3 decreases, decreasing the pressure of the signal flowing to independent jet J1 of fluidic amplifier SIM1. This causes its interaction with the flow from dependent jet J2 to change position with respect to collector C, decreasing the output signal (decrease in pressure) out of amplifier collector C to the input of decoupling fluidic resistor FR4. This decrease in pressure is transmitted to dependent jet J2 of amplifier SIM2, causing its output fed to the input P of relay RL to increase. This increased signal to relay RL causes (as was described with relation to FIG. 2) an increase in pressure through conduit OP to motor 38. Motor 38 causes its actuator 43 to move damper 34 to a position, allowing greater flow of gas from evaporator 26 to compressor 12 to decrease the temperature of secondary refrigerant flowing to the load (not shown) in conduit 29 to maintain it at the preset level desired.

Conversely, assume that temperature responsive fluidic resistor FR3 senses a temperature decrease of the refrigerant flowing to the load (not shown) in conduit 29. Under such conditions, the flow through fluidic resistor FR3 increases, causing an increase in pressure of the jet flowing out of independent jet J1 of first fluidic amplifier SIM1. This flow interacts with the jet from dependent jet J2 to increase the output of the fluidic amplifier SIM1 at its collector C. The increased output (increased pressure) flows through isolating resistor FR4 to dependent jet J2 of second amplifier SIM2 which converts the signal to a decreased output applied to the input P of relay RL. The output of relay RL decreases, decreasing the force applied to fluidic motor 38 which, therefore, urges damper 34 towards closed position to decrease the flow of refrigerant gas from evaporator 26 to compressor 12. This decreased flow decreases cooling of secondary refrigerant 29 by the refrigerator apparatus to maintain the temperature of the secondary refrigerant flowing to the load in conduit 29 to the desired value.

It may be noted that fluidic diode FD isolates the output of fluidic amplifier SIM1 from the output of the electric to fluidic transducer TD.

In this manner the fluidic temperature responsive control modulates the refrigeration apparatus to maintain the temperature of the secondary refrigerant to the load (not shown) at a desired preset value.

The load limiting portion of the control operates as follows:

The fluidic amplifier portion of the electric to fluidic transducer TD receives pressure from supply line S at SN. With a predetermined energization of its electromagnet coil (previously described) from transformer TR for normal energization of motor 10, an output fluidic signal flows through fluidic diode FD. This signal is superimposed on the fluidics signal from the temperature modulating control (previously described) from amplifier SIM1 applied through second amplifier SIM2 to the input P of relay RL. This causes the relay to place damper 34 at a predetermined position in pipe 32. As was described this position is varied by relay RL in response to temperature sensed by fluidic resistor FR3 for temperature modulation.

Next assume that the current to motor 10 through line L3 increases beyond a certain point, approaching an overload condition. This current increase (by means of transformer TR, potentiometer R1 and adjustable resistor R2) is applied to the electromagnetic coil 108 (FIG. 4) of transducer TD. As was described with respect to FIG. 4, this increased energization causes the diaphragm 106 of transducer TD to move towards control nozzle CN to assume a new position. With such movement toward control nozzle CN a lesser amount of air exhausts through vent EX of chamber 104, increasing the output signal from transducer TD flowing out of its conduit OP. Thus, the signal flowing through fluidic diode FD (FIG. 1) to jet J2 of second amplifier SIM2 increases. Amplifier SIM2 converts the increased signal to apply from its collector C a reduced signal to input P of relay RL. The output signal of relay RL, therefore, decreases, causing fluid motor 38 to move damper 34 towards closed position, decreasing the amount of refrigerant gas flowing from evaporator 26 to compressor 12. With decreased refrigerant flow to the compressor, the load on compressor 12 and, thus, on the motor 10 decreases, causing a decrease in the current drawn by the motor limiting the load to the motor.

It can be seen that the subject control provides temperature modulation of refrigeration apparatus, while limiting load to the electric motor 10 to provide a control which is easy to construct and maintain, using fluidic devices which are inexpensive, small in size, and do not require sophisticated electronic techniques or dual skills of attending personnel.

It may be noted that although for convenience the electromagnetic input to transducer TD is shown as through a current transformer TR all that is required is that it senses the current flowing through motor 10 and, where practical, the supply (L3) to the motor may itself be used as the coil 108 of the electromagnetic portion (FIG. 4) of the transducer TD.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. Refrigeration apparatus comprising a condenser, an evaporator, a compressor connected to draw refrigerant from said evaporator and discharge refrigerant into said condenser,
   means for driving said compressor,
   means for throttling the flow of gas to said compressor,
   a fluid motor for positioning said throttling means,
   temperature responsive fluidic resistor means for producing a fluidic signal indicative of the temperature of the evaporator,
   fluidic amplifier means for amplifying said fluidic signal, and
   means for transmitting the amplified fluidic signal to said fluid motor to position said throttling means.

2. Refrigeration apparatus as set forth in claim 1 wherein:
   said driving means comprise an alternating current electric motor, and
   there are provided electric to fluidic transducing means responsive to the magnitude of electrical alternating current drawn by said electric motor for transducing changes of said current magnitude into fluidic output signals of a level in accordance with the magnitude of said alternating current, and
   wherein said transmitting means receives said transducer fluidic signals superimposed onto said temperature indicating fluidic signals to position said throttling means.

3. Refrigeration apparatus as set forth in claim 1 wherein said fluidic amplifier means comprises a summing impact modulator having a dependent jet and an opposed independent jet and a collector,
   wherein a first pressure regulator is connected in series with said temperature responsive fluidic means to said independent jet,
   wherein a second pressure regulator and an adjustable flow limiting fluidic resistor are connected in series with said dependent jet, and
   wherein said pressure regulator outputs and said adjustable fluidic resistors are preset to provide certain respective fluidic streams from said jets for impacting with respect to said collector to provide a given output signal level for a certain temperature sensed by said temperature responsive fluidic resistor means establishing a set point of operation,
   said amplifier output signal being varied from said set point in response to changes to said independent jet stream by said temperature responsive fluidic resistor means.

4. Refrigeration apparatus as set forth in claim 2 wherein fluidic diode means are provided at the output of said electric to fluidic transducing means preventing fluid flow to said transducing means.

5. Refrigeration apparatus as set forth in claim 4 wherein fluidic signal inverter means are connected at the input of said transmitting means for inverting said superimposed fluidic signals.

6. Refrigeration apparatus as set forth in claim 2 wherein said electric to fluidic transducing means comprises,
   a fluidic amplifier having a control nozzle, an output nozzle and a supply nozzle,
   said amplifier providing an output signal at said output nozzle under conditions where fluid under pressure is supplied to its said supply nozzle,
   said amplifier output signal being responsive to the flow of fluid through said control nozzle,
   a member mounted for movement with respect to said control nozzle for controlling the fluid emitted therefrom,
   said member including a magnetizable portion,
   magnet means magnetically biasing said magnetizable portion to a predetermined flux saturation level,
   electromagnetic means energized in response to alternating current drawn by said motor for generating a magnetic flux,
   said electromagnetic means being arranged for magnetic interaction with said magnet means flux acting on said magnetizable member for moving said member with respect to said control nozzle in accordance with the magnitude of the energizing alternating current drawn.

7. A transducer as set forth in claim 6 wherein said control member is of spring like material.

8. A transducer as set forth in claim 7 wherein said magnet means is selected of a magnetized level sufficient for substantially saturating said magnetizable portion for causing said output fluidic signal to be directly responsive to the magnitude of said alternating current.

9. A transducer as set forth in claim 8 wherein said magnet means is a permanent magnet.

References Cited

UNITED STATES PATENTS 3,103,107  9/1963  Ehike _____ 62—217

MEYER PERLIN, Primary Examiner